(12) United States Patent
McCrary

(10) Patent No.: US 9,022,193 B2
(45) Date of Patent: May 5, 2015

(54) RECIRCULATING BALL SCREW ASSEMBLY

(71) Applicant: Paul T. McCrary, Belleville, MI (US)

(72) Inventor: Paul T. McCrary, Belleville, MI (US)

(73) Assignee: Dayco IP Holdings, LLC, Springfield, MO (US)

( * ) Notice: Subject to any disclaimer, the term of this patent is extended or adjusted under 35 U.S.C. 154(b) by 0 days.

(21) Appl. No.: 13/790,078

(22) Filed: Mar. 8, 2013

(65) Prior Publication Data

US 2014/0251748 A1 Sep. 11, 2014

(51) Int. Cl.
| | |
|---|---|
| *F16D 19/00* | (2006.01) |
| *F16H 25/22* | (2006.01) |
| *F16D 13/76* | (2006.01) |
| *F16D 23/12* | (2006.01) |
| *F16D 43/02* | (2006.01) |
| *F16D 43/21* | (2006.01) |

(52) U.S. Cl.
CPC ............ *F16D 19/00* (2013.01); *F16H 25/2214* (2013.01); *Y10T 74/19767* (2015.01); *F16D 13/76* (2013.01); *F16D 23/12* (2013.01); *F16D 43/02* (2013.01); *F16D 43/216* (2013.01); *F16D 2023/123* (2013.01)

(58) Field of Classification Search
USPC ......... 192/45.004; 74/424.85, 424.86, 424.84
See application file for complete search history.

(56) References Cited

U.S. PATENT DOCUMENTS

| | | | |
|---|---|---|---|
| 2,833,156 A * | 5/1958 | Spontelli ..................... | 74/424.84 |
| 3,176,535 A * | 4/1965 | Rowland ..................... | 74/424.83 |
| 3,667,311 A * | 6/1972 | Wysong ..................... | 74/424.75 |
| 4,074,585 A | 2/1978 | Richaud et al. | |
| 4,936,428 A * | 6/1990 | Leigh-Monstevens et al. | 477/87 |
| 5,005,436 A | 4/1991 | Brusasco | |
| 5,586,469 A | 12/1996 | Mitani et al. | |
| 5,899,114 A | 5/1999 | Dolata et al. | |
| 6,393,930 B1 | 5/2002 | Song et al. | |
| 6,668,672 B2 | 12/2003 | Kuo et al. | |
| 7,024,958 B2 * | 4/2006 | Kajita ..................... | 74/424.86 |
| 2002/0073794 A1* | 6/2002 | Ohkubo ..................... | 74/424.86 |
| 2003/0051569 A1* | 3/2003 | Kapaan et al. ............. | 74/424.85 |
| 2004/0050643 A1* | 3/2004 | Krzesicki et al. .......... | 192/70.23 |
| 2004/0221671 A1* | 11/2004 | Kajita ..................... | 74/424.88 |
| 2010/0242652 A1* | 9/2010 | Shirai et al. ................ | 74/424.87 |
| 2011/0239799 A1* | 10/2011 | Singh et al. ................ | 74/424.86 |
| 2013/0161150 A1 | 6/2013 | McCrary | |

FOREIGN PATENT DOCUMENTS

JP WO2010/061805 * 6/2010

OTHER PUBLICATIONS

Machine language translation of WO2010/061805.*

* cited by examiner

*Primary Examiner* — Ramya Burgess
*Assistant Examiner* — Mark Manley
(74) *Attorney, Agent, or Firm* — Thompson Hine LLP

(57) ABSTRACT

Ball screws are described that may be incorporated into other devices such as a pulley assembly or a differential device. The ball screws include a threaded shaft defining a central longitudinal axis with a threaded nut threadedly coupled thereto to define at least one track in between them. Each track forms a continuous loop around an infield protrusion and is filled with a plurality of rolling elements filling. Each rolling element has the same radius from the central longitudinal axis such that the nut can rotate at higher speeds without the rolling elements locking up as a result of centripetal force.

20 Claims, 6 Drawing Sheets

RECIRCULATING BALL SCREW ASSEMBLY

TECHNICAL FIELD

The present application relates generally to a recirculating ball screw assembly and to pulleys including the same as part of a decoupling mechanism.

BACKGROUND

In typical ball screw devices, a recirculation tube is used to circulate the bearings from the bottom of the ball screw back to the top. Typically a recirculation tube is positioned outward from the body of the nut and as such the bearings in the recirculation tube each have greater radii relative to the radii of those in the tracks between the threaded shaft and the threaded nut. It is known that centripetal force on the bearings is determined by the speed of rotation and the bearing's distance from the rotational axis. Accordingly, the bearings in the recirculation tube experience greater centripetal force during rotation of the ball screw than the other bearings. If the rotation is at a high enough speed, the centripetal force can impede free motion of bearings in the recirculation tube with detrimental effect on ball screw performance and durability. As such, typical ball screws are not conducive for use in an environment where the entire ball-screw assembly will rotate at high speed.

Additionally, the ball recirculation tube requires additional packaging space, which may not be suitable for some environments.

New ball screws are needed to address these concerns.

SUMMARY

New ball screws are disclosed that are smaller as a result of elimination of the recirculation tube and that provide the ability to have both the shaft and the nut subjected to high rotational speeds without impeding the bearings. The ball screws have a threaded shaft defining a central longitudinal axis and a threaded nut threadedly coupled to the threaded shaft to define at least one track in between the nut and the shaft. Each track forms a continuous loop around an infield protrusion and is filled with a plurality of rolling elements that are positioned such that each rolling element has the same radius from the central longitudinal axis. In operation, this results in centripetal forces on each roller element being equal and avoids impeding the roller elements as they move along the trailing path.

In another aspect, pulley assemblies are described that incorporate the ball screw described herein. The pulley assemblies include a pulley body having a bore, a hub defining an axis of rotation disposed within the bore of the pulley body, the ball screw disposed about the hub, and a clutch mechanism disposed about the hub. The ball screw is capable of axial expansion when the pulley body rotates in a predominant direction and the clutch mechanism is activatable into an engaged position in response to the axial expansion of the ball screw. When in the engaged position, the axial expansion of the ball screw activates the clutch mechanism, which links the pulley body to the hub for simultaneous rotation in the predominant direction.

The ball screw includes a threaded shaft translatable along the hub and a threaded nut threadedly coupled to the threaded shaft to define at least one track therebetween and coupled to the pulley body for rotation therewith. Each track forms a continuous loop around an infield protrusion as described above.

In this embodiment, the pulley is a driven pulley assembly. Here, when the sheave of the pulley assembly is being driven in the predominant direction of rotation, the clutching mechanism of the pulley assembly engages and drives an accessory input shaft coupled to the hub of the pulley for the desired smooth rotation. When relative torque reversals occur as a result of, for example, driven speed transitions, the internal clutching mechanism of the proposed pulley assembly disengages the driven accessory shaft from the outer driven sheave, thereby permitting the driven shaft to continue to rotate with momentum in the predominant direction of rotation even at speeds greater than the driven sheave of the pulley.

In another embodiment, the operating principle and mechanism within the pulley may be reversed to form a driver pulley assembly. In such a configuration, when the hub of the pulley, which is coupled to a crank shaft, is rotated in the predominant direction of rotation, the clutching mechanism of the pulley assembly engages and drives the sheave of the pulley assembly for the desired smooth rotation. When relative torque reversals occur as a result of, for example, crank shaft speed transitions, the internal clutching mechanism of the proposed pulley assembly disengages the sheave of the pulley assembly from the hub (crank shaft), thereby permitting the sheave of the pulley to continue to rotate with momentum in the predominant direction of rotation even at speeds greater than the hub or crank shaft.

In another aspect, belt drive assemblies for driving belt driven accessories in an engine of an automotive vehicle, and more particularly, to a decoupling mechanism for allowing the belt driven accessories to operate temporarily at a speed other than the belt drive assembly are also provided. Here the belt drive assembly includes the improved driven pulley described above, at least one driver pulley, and an endless belt entrained about both pulleys. In another embodiment, the belt drive assembly may include the improved driver pulley at the crank shaft, at least one driven pulley and an endless belt entrained about both pulleys. In yet another embodiment, the belt drive assembly may include the improved driver pulley at the crank shaft, the improved driven pulley, and an endless belt entrained about both pulleys.

The pulley assemblies disclosed herein provide both over-running and decoupling capability that exceeds current performance and maintains the level of practicality demanded by the automotive industry.

Advantages and features of the invention will be apparent from the following description of particular embodiments and from the claims.

DETAILED DESCRIPTION

Figure 1:
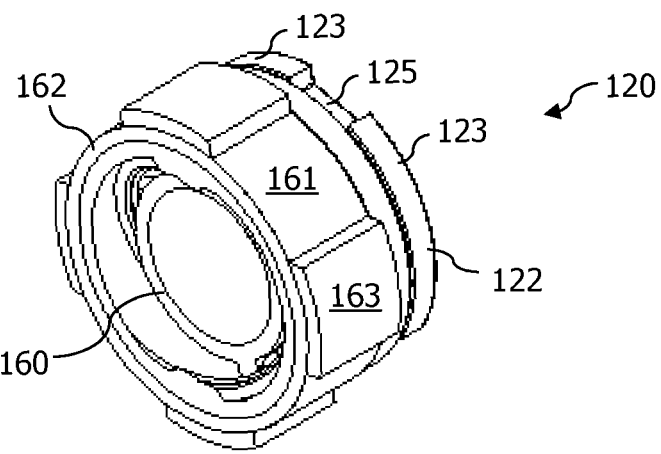
FIG. 1 is a side perspective view of a ball screw assembly.

The following detailed description will illustrate the general principles of the invention, examples of which are additionally illustrated in the accompanying drawings. In the drawings, like reference numbers indicate identical or functionally similar elements.

Figure 2:
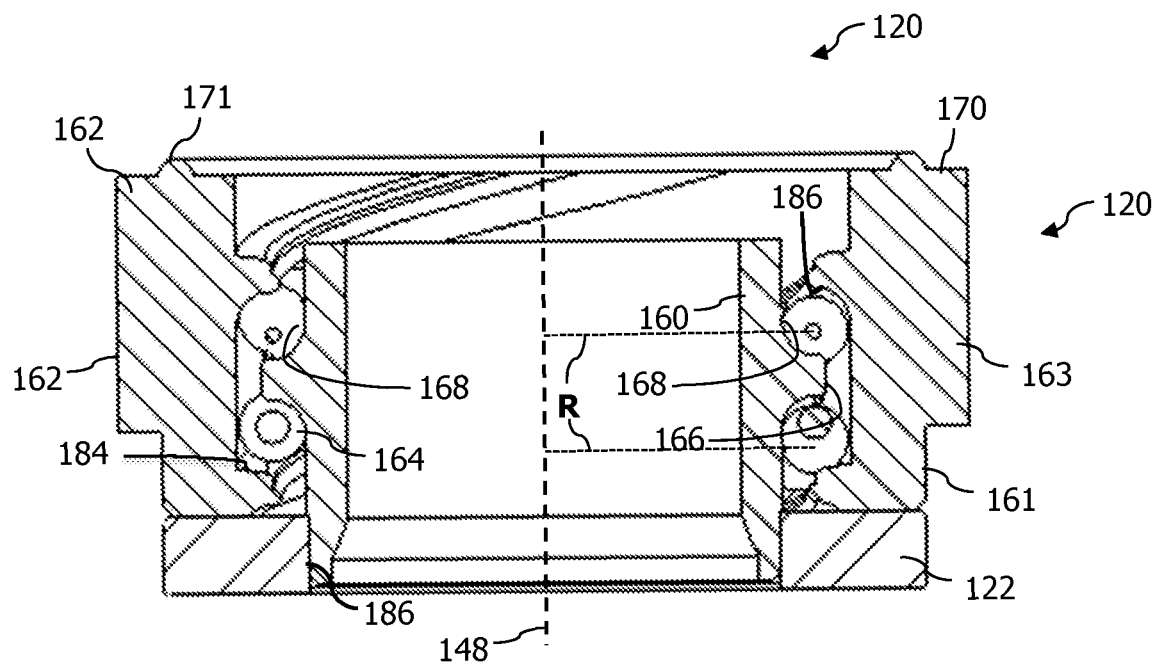
FIG. 2 is a longitudinal cross-section of the ball screw assembly of FIG. 1
Figure 3:
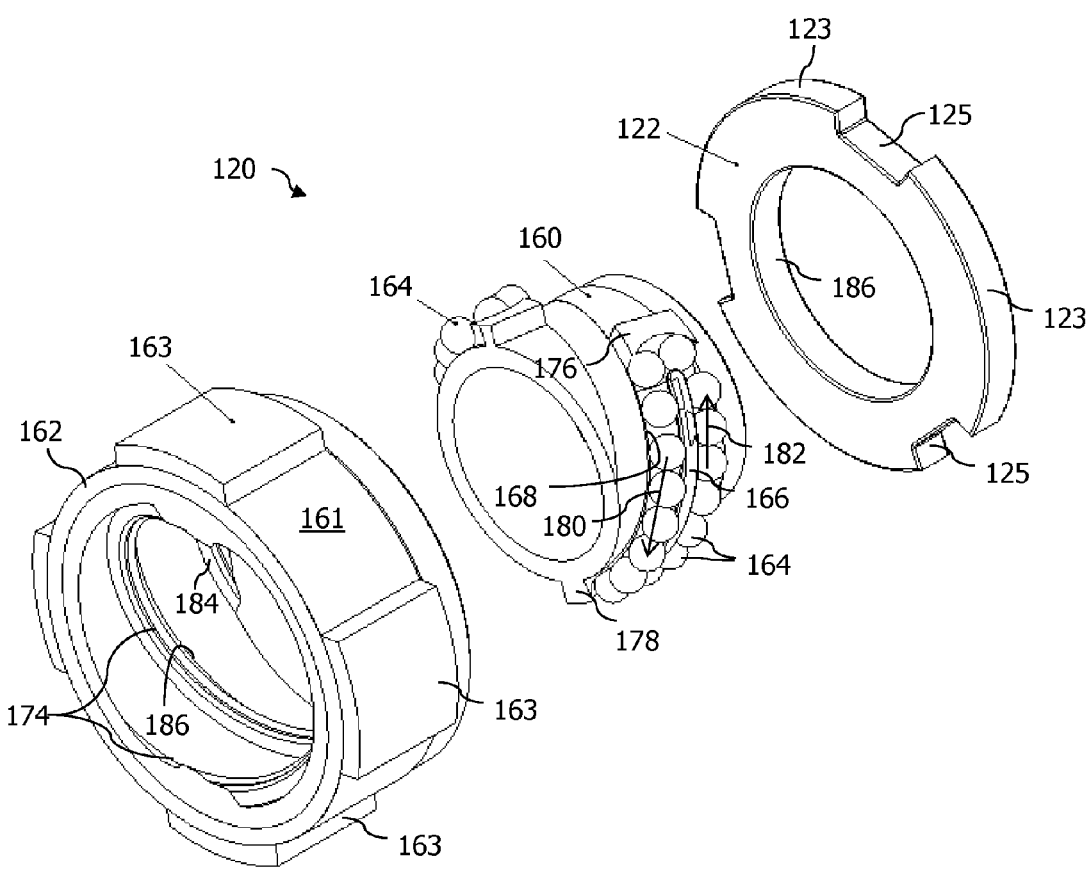
FIG. 3 is an exploded view of the ball screw assembly of FIG. 1.
Figure 4:
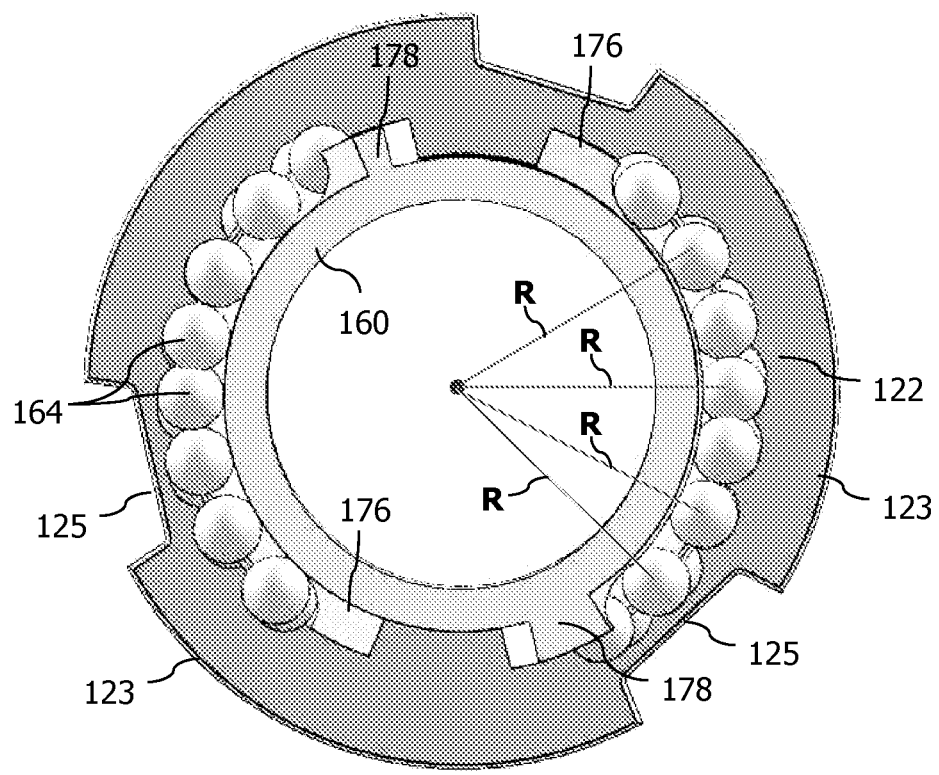
FIG. 4 is an end plan view of a two-start threaded shaft connected to a drive plate.

Referring to FIGS. 1-3, a ball screw, generally designated 120, for inclusion in other devices is illustrated. The ball screw 120 includes a threaded nut 162 disposed concentrically about a threaded shaft 160 such that the shaft 160 and the nut 162 define at least one track 168 therebetween (FIGS. 2 and 3) for a plurality of rolling elements 164. The threaded shaft defines a central longitudinal axis 148 about which at least one of the components rotates. As seen in FIG. 3, each track 168 forms a continuous loop around an infield protrusion 166 and is filled with a plurality of rolling elements 164. Here, the ball screw 120 does not include a typical ball return or recirculation tube connecting the bottom of the raceway to the top of the raceway to recirculate the rolling elements 164. Instead, each of the rolling elements 164 are positioned within the track 168 where each has the same radius R from the central longitudinal axis 148 as shown in FIGS. 2 and 4.

The ball screw 120 converts rotary motion into translator motion while both the shaft and the nut are subjected to high rotational speeds. The arrangement of the rolling elements 164, having equal radii, provide equal centripetal forces and prevent the rolling elements that are recirculated from being held in place ("locking-up") within the ball screw.

Figure 6:
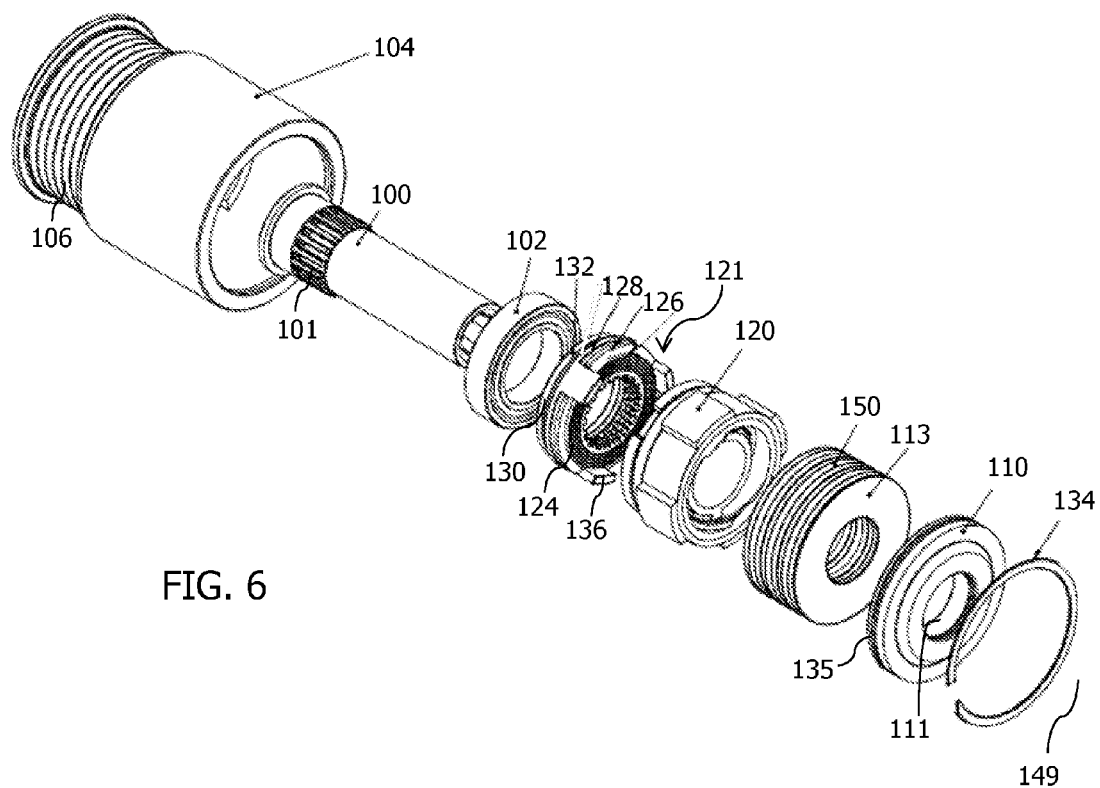
FIG. 6 is an exploded, perspective view of an embodiment of a pulley assembly for use in an accessory drive system such as that illustrated in FIG. 5.
Figure 7:
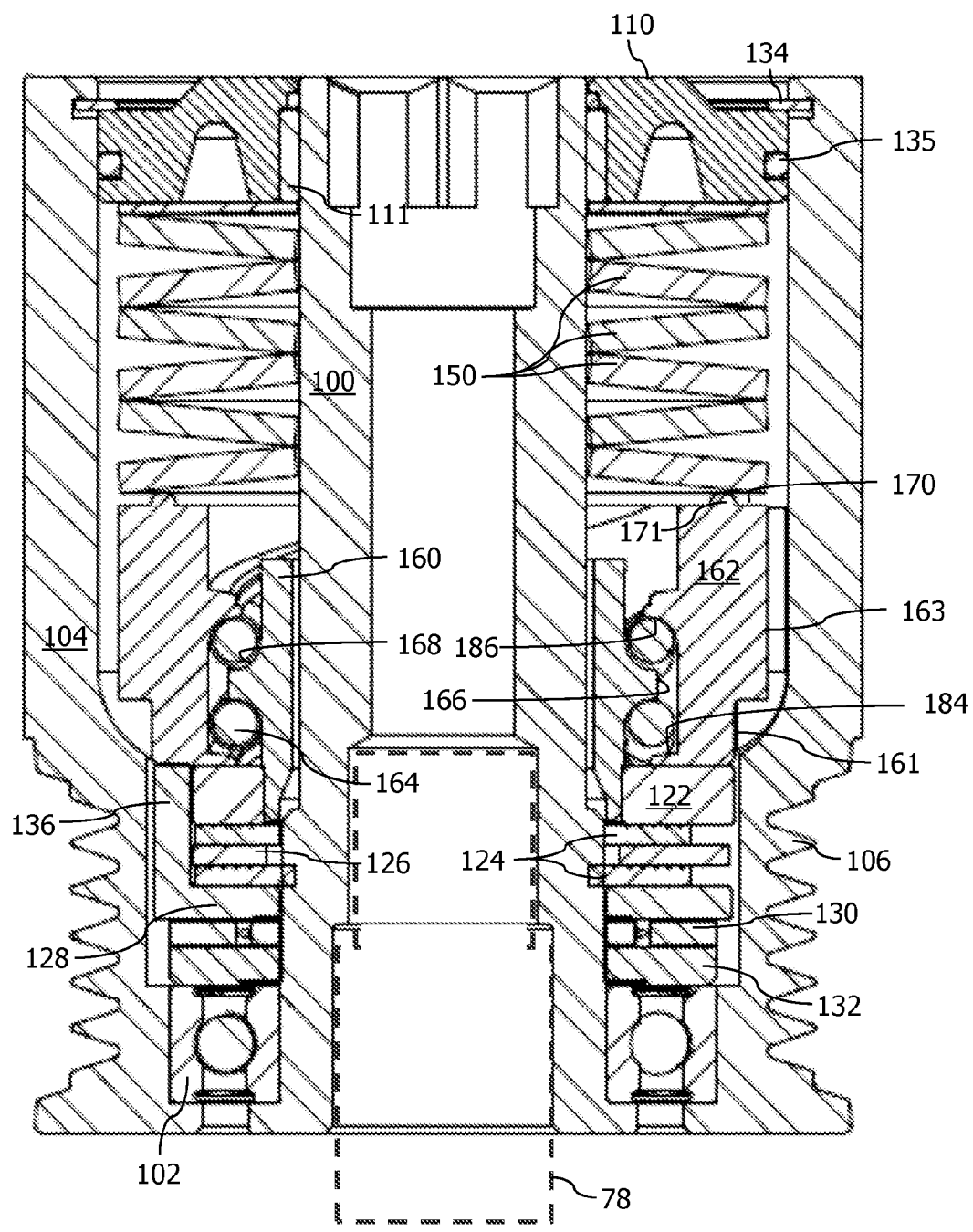
FIG. 7 is an assembled, longitudinal cross-sectional view of the pulley assembly of FIG. 6.

The threaded nut 162 may include connecting features 163 on the exterior surface 161 thereof to connect the nut to a rotatable member, not shown in FIGS. 1-4. In one embodiment, the rotatable member may be a component of a differential system, and the shaft 160 is coupled to another rotatable member for rotation therewith. Here, both the shaft 160 and the nut 162 rotate with their respective rotational member and no translation of the nut occurs when the shaft and the nut have the same rotational speed, but translation of the nut does occur when either the shaft or the nut rotates at a speed relative to the other. In another embodiment, the rotatable member may be a pulley 104, as shown in FIGS. 6 and 7, and the shaft 160 is connected to a second rotatable member (hub 100) to drive the second rotatable member. It is also possible for the configuration to be reversed, where the second rotatable member rotates the shaft 160 to ultimately drive the first rotatable member coupled to the nut 162.

Referring now to FIG. 2, on the upper surface 170 of the nut, a surface lying generally perpendicular to the central longitudinal axis 148, a protruding annular ridge 171 is present that is concentric about the shaft 160. The protruding annular ridge 171 is spaced a distance inward toward the central longitudinal axis 148 away from the exterior surface 161 of the nut 162 and provides a seat for another component of an assembly incorporating the ball screw. In the embodiment of FIG. 7, the component seated on the annular ridge 171 is a Bellville washer 150.

Referring now to FIGS. 2-4, each track 168 within the ball screw 120 includes, in addition to the infield protrusion 166, a first end partition 176 defining a first turnaround and a second end partition 178 defining a second turnaround. The continuous loop formed by the track 168 has, as labeled in FIG. 3, a leading path 180 from the first end partition 176 to the second end partition 178 and a trailing path 182 from the second end partition 178 to the first end partition 176. The trailing path 182 is wider than the leading path 180 such that the roller elements 164 circulate back to the leading path 180 without a load thereon. In one embodiment, the increased width of the trailing path 182 is a result of the portion of the threading 174 facing the roller elements 164 having a generally flat surface 184 (labeled in FIGS. 2-3) that is substantially perpendicular to the central longitudinal axis 148. This is in contrast to an arcuate or semi-circular portion 186 (also labeled in FIGS. 2-3) of the threading 174 facing the roller element 164 in the leading path 180. This threading 174 may include less than a full turn, a full turn, or multiple turns. In another embodiment trailing path 182 is wider than the leading path 180 such that the roller elements 164 circulate back to the leading path 180 without a load thereon. In this embodiment the portion of the threading 174 is an arcuate or semi-circular, same or similar to 186. In this embodiment leading and trailing tracks are interchangeable, either track can lead and either track can trail.

As seen in FIGS. 2-4, the shaft 160 is illustrated as having the field protrusion 166 and the first and second end partitions 176, 178 on the exterior surface thereof and the nut 162 as having, on its interior surface, threading 174 that aligns with the outside of each of the leading path 180 and the trailing path 182 of the continuous loop of rolling elements 164. The invention is not limited thereto and may in an alternate embodiment be reversed such that the nut 162 includes the filed protrusion and the first and second partitions and the shaft 160 has the threading that aligns with the outside of each of the leading path and the trailing path. In either embodiment, the component having the field protrusion 166 and the first and second end partitions 176, 178 may be arranged in a single start, a double start, or a triple start threading configuration. Moreover, whichever component has the first and second partitions 176, 178 may have them fixedly attached thereto, removably attached thereto, or formed integral therewith.

For any of the embodiments disclosed herein, the roller elements 164 may be spherical bearings, uniformly cylindrical bearings, or tapered cylindrical bearings.

These embodiments are advantageous in eliminating the need for a recirculation tube that takes up additional space, providing smaller packaging transverse to the line of actuation, and being able to operate at higher rotational speeds. In one embodiment, the rotational speeds experienced by the nut or the shaft may be about 2,000 to about 20,000 rpm. In the disclosed embodiments, as explained above, the roller elements 164 are all positioned to have identical radii measured from the central longitudinal axis 148. In operation, this results in centripetal forces on each roller element being equal and avoiding an encumbrance of the roller elements as they move along the trailing path. The embodiments also provide a ball screw with lower load capacity since only the leading arcuate or semi-circular portion of the threading supports a load from the roller elements (the trailing path must provide free movement of the roller elements to circulate back to the leading path).

In one embodiment, as seen in FIGS. 1-4, the threaded shaft 160 is connected to a drive plate 122. The drive plate 122 may have a bore 186 (FIG. 3) in which the threaded shaft 160 is seated, and once assembled rotate together as a unit. The drive plate 122 may include a key, keyway, tabs, splines, cogs, or the like 125 in or extending from the surface defining its outer diameter. In the accompanying figures, the drive plate 122 has cogs 123 as part of the outer surface thereof separated from adjacent cogs 123 by gap 125 which is dimensioned to receive the tabs 136 of a holder 128 (shown in FIG. 6). As assembled in FIG. 6, the tabs 136 of the holder are seated in the gaps 125 of the drive plate 122, but the drive plate 122 is able to translate axially relative to the holder 128. This is just one embodiment and should not be construed as limiting the claims.

Figure 5:
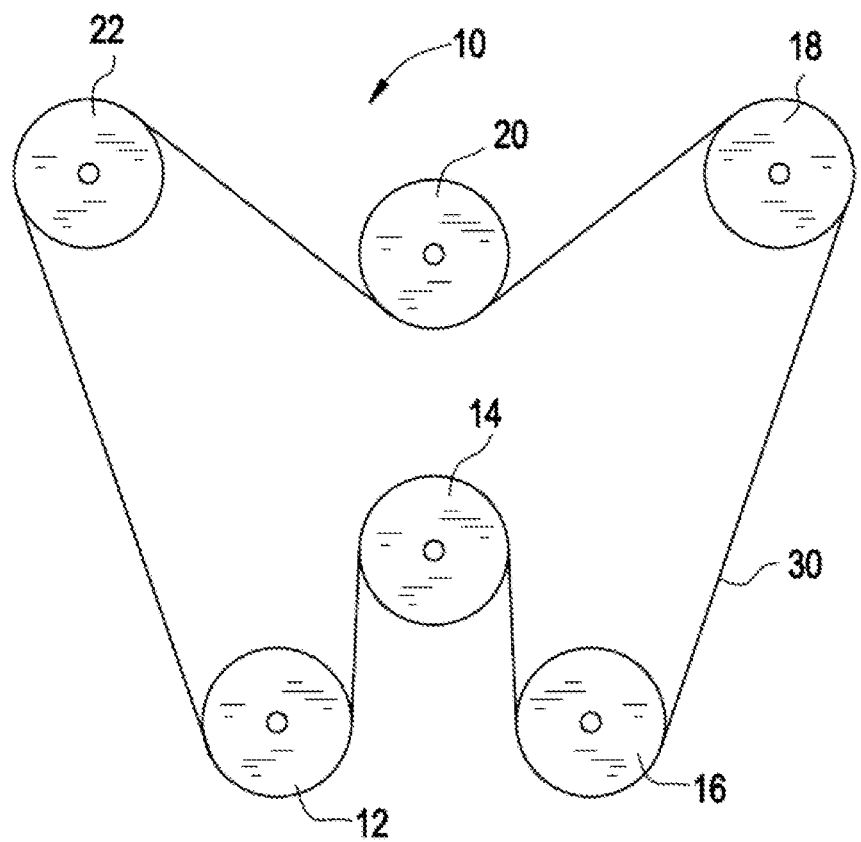
FIG. 5 is a diagrammatic view of an embodiment of an accessory drive system.

Referring now to FIG. 5, an accessory drive system 10 of, for example, an internal combustion engine of an automobile includes an endless belt 30 that is used to drive a number of accessories. The various accessories are represented in FIG. 5 diagrammatically by their pulley assemblies. The belt 30 is entrained around a crank pulley assembly 12, a fan/water pump pulley assembly 14, a power steering pulley assembly 18, an idler pulley assembly 20 and a tensioner pulley assembly 22. In some embodiments, the tensioner pulley assembly 22 includes damping, such as asymmetric damping with a frictional damper to resist lifting of the tensioner arm away from the belt 30.

The various accessories are driven through use of pulley assemblies 14, 16, 18, 20 and 22 that are themselves rotated by the belt 30. For purposes of description, pulley assembly 16 of an alternator will be focused on below. It should be noted, however, that the other pulley assemblies of one or more of the other accessories may also operate in a fashion similar to that of pulley assembly 16.

Referring now to FIGS. 6 and 7, pulley assembly 16 transfers input torque from the belt 30 to the input shaft 78 of an accessory (shown in FIG. 7), for example an alternator or fan, when rotated in a predominant rotational direction and also isolates the input shaft 78 from relative torque reversals between the pulley assembly 16 and the input shaft 78. When such relative torque reversals between the pulley assembly 16 and the input shaft 78 occur, an internal decoupler system of the pulley assembly 16 acts to disengage the input shaft 78 from the torque reversal, also referred to as an overrunning condition, thereby permitting the accessory input shaft 78 to continue rotating with momentum in the predominate operational direction.

The power input into the pulley assembly 16 is through the pulley body 104 as it is rotated by its contact with a belt such as belt 30 in FIG. 5. Power output is through the hub 100 (that in use may be affixed to a shaft to operate another device). Support between the pulley body 104 and the hub 100 includes bearing 102 and cap 110. Cap 110 is fixed to the pulley body 104 and includes a load support bushing 111 to allow relative rotation between the hub 100 and the cap 110 and, by material selection, a controllable portion of Coulomb damping. In this embodiment, the actuator capable of axial expansion when the pulley body rotates in a predominant direction is a ball screw actuator 120 as described above, which is disposed about the hub 100. The clutch mechanism in FIGS. 6-7 is a clutch pack 121 disposed about the hub and activatable into an engaged position by the axial expansion of the ball screw 120. In another embodiment, the clutch mechanism may be a cone clutch such as that described in U.S. application Ser. No. 13/713,247, filed Dec. 13, 2012, PULLEY ASSEMBLY WITH DECOUPLING MECHANISM, incorporated herein by reference in its entirety.

Moving from left to right in FIG. 6 the pulley assembly includes a retaining ring 134, seal 135, a cap 110, a bushing 111, preload spring 113, springs 150, spring seat 118, ball screw actuator 120, drive plate 122, clutch pack 121, bushing 130, plate 132, shaft 100, bearing 102, and pulley body 104. The pulley body 104 includes a belt-engaging surface 106. The cap 110 may also include a secondary seal 135 such as an O-ring. The springs 113, 150 act to bias components of the pulley assembly 116 axially for maintained engagement during operation of the pulley. In FIGS. 6-7 the springs 150 are a plurality of Belleville washers. The number of springs may be varied as well as the material of the springs to change the characteristics of the pulley assembly as described above. The ball screw actuator 120 and clutch pack 121 will be described below. The bearing 102 is as described above in the other embodiments and provides the same advantages.

As seen in the exploded view FIG. 6, the threaded shaft 160 of the ball screw actuator 120 is connected to the drive plate 122. The drive plate 122 is as described above. Here, the drive plate 122 has cogs 123 as part of the outer surface thereof separated from adjacent cogs 123 by gap 125 which is dimensioned to receive the tabs 136 of the holder 128. As assembled in FIG. 7, the tabs 136 of the holder are seated in the gaps 125 of the drive plate 122, but the drive plate 122 is able to translate axially relative to the holder 128. The nut 162 also includes keys or splines 163 that mate with keyways (not shown) inside the bore of the pulley body 104. This splined connection (or key-to-keyway connection) mates the nut 162 to the pulley body 104 for rotation together about the axis of rotation 149 defined by the shaft 100.

The clutch mechanism in FIGS. 6-7 is shown as a clutch pack 121 comprising a plurality of plates of alternating friction discs 124 and clutch plates 126. In one embodiment, the clutch pack 121 may include just one clutch plate 126 and two friction discs 124 packed into a holder 128, but may contain only one of each or a plurality of each. The holder 128 is as described above. The friction discs 124 are splined (see splines 152) such that they are connected to the mating splines 101 of the shaft 100 such that the shaft 100 is rotatably connected to the friction discs 124, but the friction discs 124 are still free to axially translate relative to the shaft 100. Accordingly, when the clutch pack 121 is activated by axial expansion of the ball screw actuator 120, the friction discs 124 and clutch plates 126 are moved axially into frictional engagement with one another such that they will rotate together as a unit.

As just described, the ball screw actuator 120, during operation of the pulley assembly, axially expands to activate the clutch mechanism 121. The nut 162 is keyed to the pulley body 104 for rotation therewith, and when the pulley 104 rotates in the predominant direction, the nut 162 rotates therewith about the threaded shaft 160 until the nut 162 has moved axially to an expanded position that moves the drive plate 122 away from the nut 162 and into engagement with the components of the clutch pack 121. As a result of the axial movement of the drive plate 122, the clutch pack components are also moved axially into frictional engagement with one another. Now, the clutch pack 121 is engaged and the pulley body 104 and the shaft 100 are connected for rotation together about the axis of rotation 149.

Then, when the pulley body 104 rotates in a direction opposite the predominant direction, for example, experiences a torque reversal, the clutch pack 121 disengages from the actuator 120 as a result of the actuator 120 rotating with the pulley body 104 and thereby relieving the axial expansion (contracting back to a non-engaged position) which allows the hub 100 to rotate independently of the pulley body 104. The hub 100 can continue to rotate in the predominant direction under its remaining momentum, which can allow the hub to rotate at speeds greater than speeds of the pulley body. This is also known as an overrun or freewheel position.

In FIGS. 6-7, the biasing members 150 are positioned between the actuator 120 and the cap 110. However, the biasing members 150 are not limited to this position. In another embodiment, the biasing members may be disposed between the actuator 120 and the clutch mechanism, clutch pack 121.

Various parameters can affect the operation, responsiveness, and performance of the ball screw and/or pulley assemblies disclosed herein, including the pitch of the threading within the ball screw, the coefficients of friction between components in frictional engagement with one another, and the spring rate of the biasing member. Other factors that affect the selection of a particular combination include wear, primary clutching, durability and cost.

Various embodiments are disclosed herein, and one of skill in the art should appreciate that the ball screw, clutch mechanisms and spring configurations can be mixed and matched to create additional embodiments. Additionally, in one embodiment, the pulley assembly may be connected to a crank shaft and used to drive a belt. To operate in such an application, the order of the components in the pulley assembly are reversed such that the ball screw is connected to the hub (and hence the crank shaft) and the clutch mechanism in an engaged position links the hub to the pulley body for simultaneous rotation.

The embodiments have been described in detail with respect to the figures presented herein, but it is apparent that numerous variations and modifications are possible without departing from the spirit and the scope of the invention as defined in the following claims.

What is claimed is:

1. A ball screw comprising:
a unitary threaded shaft defining a central longitudinal axis;
a threaded nut threadedly coupled to the threaded shaft to define at least one track located within the unitary threaded shaft, each track forming a continuous loop around an infield protrusion that defines a first end partition defining a first turnaround and a second end partition defining a second turnaround, the continuous loop defining a leading path and a trailing path, the trailing path having a trailing width including a fixed width that is greater than a leading width of the leading path, and the trailing width and the leading width both being measured from the infield protrusion;
a plurality of rolling elements filling each track, the rolling elements configured to circulate from the trailing path back to the leading path of the track during operation of the ball screw;
wherein each rolling element located in both the leading path and the trailing path of the continuous loop have a same radius from the central longitudinal axis.

2. The ball screw of claim 1 wherein an exterior surface of the nut is connectable to a first rotatable member for rotation therewith.

3. The ball screw of claim 2 wherein the nut rotates at speeds of about 2,000 to about 20,000 rpm.

4. The ball screw of claim 2 wherein the unitary threaded shaft is connectable to a second rotatable member to be driven by the first rotatable member.

5. The ball screw of claim 2 wherein the unitary threaded shaft is connectable to a second rotatable member for rotation therewith; wherein no translation of the nut occurs when the unitary threaded shaft and the nut have the same rotational speed and translation of the nut occurs when either the unitary threaded shaft or the nut rotates at a speed different relative to the other.

6. The ball screw of claim 1 wherein the threaded nut has a double start or a triple start threading.

7. The ball screw of claim 1 wherein the roller elements are spherical, uniformly cylindrical, or tapered cylindrical bearings.

8. The ball screw of claim 1 wherein the leading path is from the first end partition to the second end partition and the trailing path is from the second end partition to the first end partition; wherein the trailing path circulates the roller elements unloaded back to the leading path.

9. The ball screw of claim 1 wherein the infield protrusion and the first and second end partitions protrude from an exterior surface of the unitary threaded shaft.

10. The ball screw of claim 1 wherein the threaded nut includes less than a full turn, a full turn, or multiple turns.

11. The ball screw of claim 1 wherein the nut is coupled to a pulley body for rotation therewith.

12. The ball screw of claim 11 wherein the unitary threaded shaft is coupled to a drive plate connectable to a clutch mechanism.

13. A pulley assembly comprising:
a pulley body having a bore;
a hub defining an axis of rotation disposed within the bore of the pulley body;
a ball screw disposed about the hub, the ball screw capable of axial expansion when the pulley body rotates in a predominant direction and comprising:
a unitary threaded shaft translatable along the hub;
a threaded nut threadedly coupled to the threaded shaft to define at least one track located within the unitary threaded shaft and coupled to the pulley body for rotation therewith, each track forming a continuous loop around an infield protrusion that defines a first end partition defining a first turnaround and a second end partition defining a second turnaround, the continuous loop defining a leading path and a trailing path, the trailing path having a trailing width including a fixed width that is greater than a leading width of the leading path, and the trailing width and the leading width both being measured from the infield protrusion;
a plurality of rolling elements filling each track, the rolling elements configured to circulate from the trailing path back to the leading path of the track during operation of the ball screw;
wherein each rolling element located in both the leading path and the trailing path of the continuous loop have a same radius from the axis of rotation; and
a clutch mechanism disposed about the hub, the clutch mechanism being activatable into an engaged position by the axial expansion of the ball screw;
wherein in the engaged position the axial expansion of the ball screw activates the clutch mechanism, which links the pulley body to the hub for simultaneous rotation in the predominant direction.

14. The pulley assembly of claim 13 wherein the threaded nut has a double start threading or a triple start threading, and the roller elements are spherical, uniformly cylindrical, or tapered cylindrical bearings.

15. The pulley assembly of claim 13 wherein the leading path is from the first end partition to the second end partition and the trailing path is from the second end partition to the first end partition; wherein the trailing path circulates the roller elements unloaded back to the leading path.

16. The pulley assembly of claim 13 wherein the infield protrusion protrudes from an exterior surface of the unitary threaded shaft.

17. The pulley assembly of claim 13 further comprising a biasing member biasing the nut or shaft of the ball screw axially into maintained contact during operation of the pulley assembly, the biasing member disposed between the ball screw and a cap or between the ball screw and the clutch mechanism.

18. The pulley assembly of claim 17 wherein the biasing member includes one or more Belleville washers.

19. The pulley assembly of claim 13 wherein the clutch mechanism includes a clutch pack or a cone clutch.

20. The pulley assembly of claim 13 wherein when the pulley body rotates in a direction opposite the predominant direction or experiences a deceleration, the clutch mechanism disengages from the ball screw and allows the hub to rotate independently of the pulley body in the predominant direction under its own momentum.

* * * * *